United States Patent
Baba et al.

(10) Patent No.: US 8,453,938 B2
(45) Date of Patent: Jun. 4, 2013

(54) RADIO TAG AND METHOD FOR MANUFACTURING RADIO TAG

(75) Inventors: Shunji Baba, Kawasaki (JP); Shigeru Hashimoto, Inagi (JP); Tsuyoshi Niwata, Inagi (JP); Yoshiyasu Sugimura, Inagi (JP); Satoru Nogami, Inagi (JP); Mimpei Miura, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 22 days.

(21) Appl. No.: 13/067,702

(22) Filed: Jun. 21, 2011

(65) Prior Publication Data

US 2011/0315776 A1   Dec. 29, 2011

(30) Foreign Application Priority Data

Jun. 23, 2010   (JP) ................... 2010-142432

(51) Int. Cl.
*G06K 19/06* (2006.01)
(52) U.S. Cl.
USPC ........................................................ 235/492
(58) Field of Classification Search
USPC ........................................................ 235/492
See application file for complete search history.

(56) References Cited

U.S. PATENT DOCUMENTS

| 7,975,414 B2 | 7/2011 | Ritamäki et al. |
| 8,022,829 B2 | 9/2011 | Takeda et al. |
| 2008/0297318 A1 | 12/2008 | Ohashi |

FOREIGN PATENT DOCUMENTS

| EP | 1632926 A1 | 3/2006 |
| JP | 2006-338361 | 12/2006 |
| JP | 2007-213329 | 8/2007 |
| JP | 2008-009537 | 1/2008 |
| KR | 10-2007-0083606 | 8/2007 |
| KR | 2007-213329 | 8/2007 |

OTHER PUBLICATIONS

European Search Report dated Dec. 23, 2011 issued in corresponding European Patent Application No. 11170954.9.
Korean Office Action dated Jun. 25, 2012 issued in corresponding Korean Patent Application No. 10-2011-0060864.

*Primary Examiner* — Kristy A Haupt
(74) *Attorney, Agent, or Firm* — Staas & Halsey LLP (57) ABSTRACT

A radio tag is disclosed that includes an inlet having a base member, an antenna pattern, and a circuit chip for performing radio communications, the antenna pattern and the circuit chip being provided in the base member and includes a spacer on which the inlet is provided. The spacer has a length in a longitudinal direction thereof twice or more as great as a length of the inlet in the longitudinal direction. The spacer has a flection part at which the spacer is foldable in such a manner as to form an attached surface to be attached to an attached subject of the radio tag.

14 Claims, 12 Drawing Sheets

RADIO TAG AND METHOD FOR MANUFACTURING RADIO TAG

CROSS-REFERENCE TO RELATED APPLICATION

This application is based upon and claims the benefit of priority of Japanese Patent Application No. 2010-142432, filed on Jun. 23, 2010, the entire contents of which are incorporated herein by reference.

FIELD

The embodiment discussed herein is related to a radio tag for performing radio communications and a method for manufacturing the radio tag.

BACKGROUND

A known radio tag includes a RFID (Radio Frequency Identification) tag or the like. The radio tag performs radio communications with a reader/writer to read and write data. The radio tag is provided with an inlet inside it, and the inlet has an IC (Integrated Circuit) chip connected to an antenna pattern for performing radio communications. The IC chip sends and receives signals using the antenna pattern to perform radio communications or the like with the reader/writer.

There may be a case that the radio tag is attached to the metal surface of an attached subject where reflection, absorption, or the like of radio waves occurs. Also, there may be a case that the radio tag is attached to an attached subject containing liquid by which reflection, absorption, or the like of radio waves occurs. In these cases, there is a likelihood of reducing a radio communication distance that enables radio communications between the IC chip and the reader/writer. Therefore, a spacer for separating the inlet or the antenna pattern from the attached subject by a certain distance or more is provided between the inlet and the attached subject, thereby increasing the radio communication distance. Note that the following Patent Documents have been known as related art cases.

Patent Document 1: Japanese Laid-open Patent Publication No. 2006-338361

Patent Document 2: Japanese Laid-open Patent Publication No. 2008-9537

Since the spacer provided in the radio tag is manufactured so as to conform with the shape of the attached subject as evident from the Patent Documents, the size of the spacer is fixed. Accordingly, if the shape of the attached subject to which the radio tag having the spacer is attached is changed, the size of the spacer does not conform with the attached subject and thus the radio tag cannot be attached. In order to attach the radio tag to the attached subject whose shape is changed, it is required to redesign and remanufacture the spacer so as to conform with the shape of the attached subject. As a result, the cost of redesigning and remanufacturing the spacer is required.

SUMMARY

According to an aspect of the present invention, there is provided a radio tag including an inlet having a base member, an antenna pattern, and a circuit chip for performing radio communications, the antenna pattern and the circuit chip being provided in the base member; and a spacer on which the inlet is provided. The spacer has a length in a longitudinal direction thereof twice or more as great as a length of the inlet in the longitudinal direction. The spacer has a flection part at which the spacer is foldable in such a manner as to form an attached surface to be attached to an attached subject of the radio tag.

According to another aspect of the present invention, there is provided a radio tag including an inlet having a base member, an antenna pattern, and a circuit chip for performing radio communications, the antenna pattern and the circuit chip being provided in the base member; and a spacer on which the inlet is provided. The spacer has a length in a longitudinal direction thereof twice or more as long as a length of the inlet in the longitudinal direction. The spacer has flexibility so as to be windable on an attached subject of the radio tag in a superposed state.

According to still another aspect of the present invention, there is provided a method for manufacturing a radio tag, including conveying a spacer having an adhesive member on an upper surface thereof; bonding on the upper surface of the spacer plural inlets, each of which has a circuit chip for performing radio communications and an antenna pattern provided on a base member, at intervals twice or more as long as lengths of the inlets in a conveyance direction of conveying the spacer; sticking a first separation sheet on the inlets and the spacer; and providing detaching lines at the intervals in the spacer and the first separation sheet between the inlets.

The object and advantages of the present invention will be realized and attained by means of the elements and combinations particularly pointed out in the claims.

It is to be understood that both the foregoing general description and the following detailed description are exemplary and explanatory and are not restrictive of the present invention as claimed.

DESCRIPTION OF EMBODIMENTS

Next, embodiments of the present invention are described below with reference to the accompanying drawings.

First Embodiment

Figure 1:
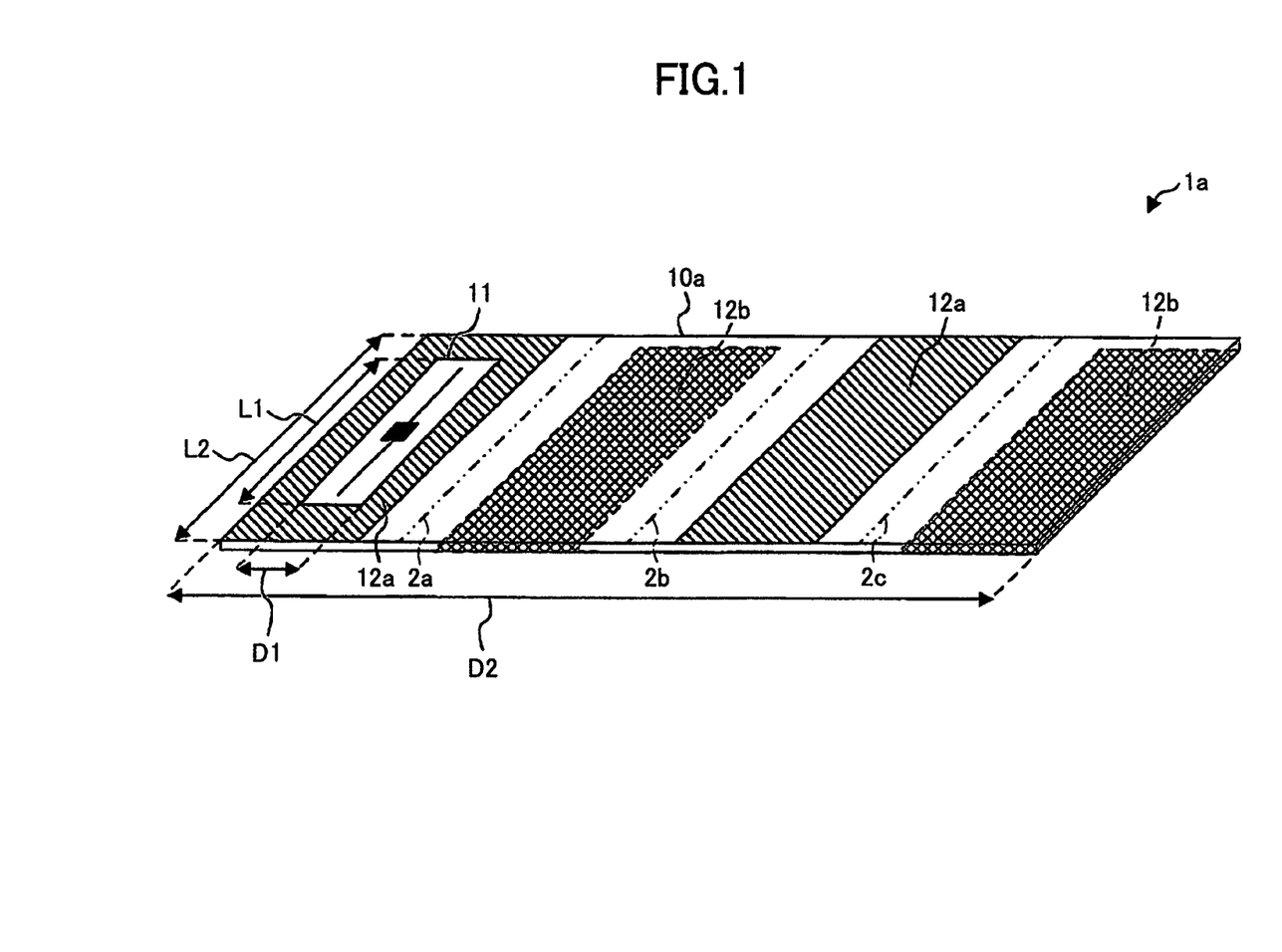
FIG. 1 is a perspective view illustrating a radio tag according to a first embodiment.
Figure 2:
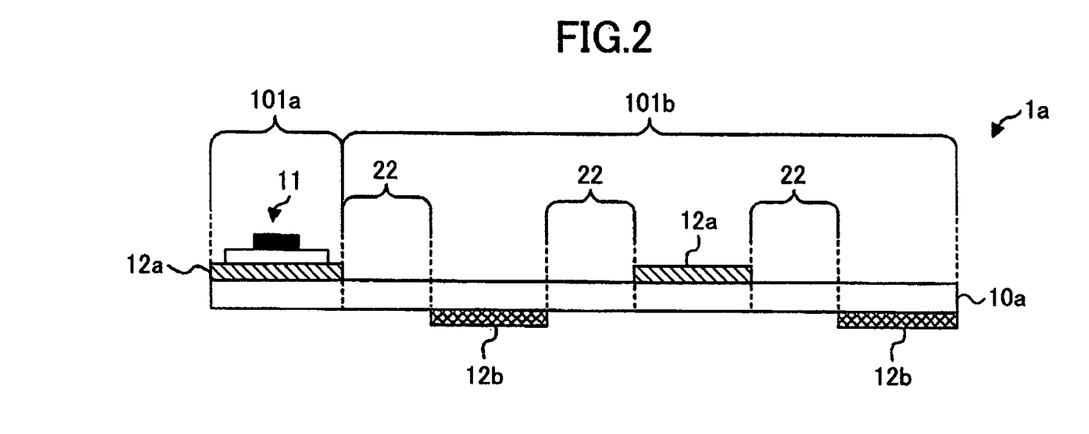
FIG. 2 is a side view illustrating the radio tag according to the first embodiment.

First, a radio tag according to a first embodiment is described with reference to FIGS. 1 and 2. FIG. 1 is a perspective view illustrating a radio tag 1a according to the first embodiment. FIG. 2 is a side view illustrating the radio tag 1a according to the first embodiment. As illustrated in FIG. 1, the radio tag 1a has two adhesive members 12a (indicated by oblique lines) at intervals on the upper surface of a rectangular spacer 10a and has an inlet 11 bonded onto the adhesive member 12a at the end part of the spacer 10a.

As illustrated in FIG. 2, the spacer 10a is composed of a first spacer 101a in which the inlet 11 is provided and a second spacer 101b connected to the first spacer 101a via a folding part 22 (to be described below) in parallel with the surface of the first spacer 101a in which the inlet 11 is provided. The first spacer 101a supports the inlet 11 to prevent the inlet 11 from being folded, and acts as a protecting member that covers and externally protects the inlet 11 when the folding part 22 is folded. The second spacer 101b acts as a spacer for separating the inlet 11 from an attached subject by a certain distance or more when the folding part 22 is folded.

The spacer 10a is a plate-like member made of a foldable material having flexibility, and is preferably a dielectric body. For example, a rubber sheet or a PET (Polyethylene Terephthalate) film can be used as the spacer 10a. The spacer 10a has preferably a thickness by which the spacer 10a can be easily curved and folded, and can have a thickness of, for example, 0.1 mm.

As illustrated in FIG. 1, on the upper surface of the second spacer 101b, lines 2a through 2c indicating folding points are provided at given intervals so as to be orthogonal to the longitudinal direction of the second spacer 101b. The first spacer 101a can be folded in such a manner as to superpose its upper surface on the upper surface of the second spacer 101b along the line 2a. In addition, the second spacer 101b can be folded in such a manner as to superpose its upper surface one surface on another along the line 2c and superpose its lower surface one surface on another along the line 2b. Portions of the spacer 10a at which the spacer 10a is folded act as folding parts 22.

As illustrated in FIG. 2, on the lower surface of the second spacer 101b, two adhesive members 12b (indicated by hatching) are provided at intervals similar to those (lengths of the folding parts 22) of the adhesive members 12a provided at the two positions. The adhesive members 12b are provided outside the ranges of the rear surfaces of the adhesive members 12a. That is, the adhesive members 12a and 12b are provided in such a manner as to be alternated on the upper and lower surfaces of the spacer 10a. Provision of the adhesive members 12a and 12b enables the folding parts 22 to be folded along the lines 2a through 2c, whereby the superposed surfaces of the spacer 10a can be bonded via the adhesive members 12a or the adhesive members 12b when the spacer 10a is folded up. The adhesive members 12a and 12b are not particularly limited but are only required to be bonded onto an attached subject and the spacer 10a. As such, acrylic adhesive members can, for example, be used.

Note that in the radio tag 1a according to the first embodiment, the adhesive members 12a and 12b are provided in such a manner as to be alternated on the upper and lower surfaces of the spacer 10a. However, the provision of the adhesive members 12a and 12b is not limited to this. The adhesive members 12a and 12b are only required to be provided on one of the surfaces of the spacer 10a superposed one surface on another when the spacer 10a is folded up. In addition, in the radio tag 1a according to the first embodiment, the lines 2a through 2c are provided on the spacer 10a. However, instead of the provision of the lines 2a through 2c on the spacer 10a, a user of the radio tag 1a may arbitrarily fold the spacer 10a by himself or herself.

Further, as illustrated in FIG. 1, the adhesive members 12a and 12b are provided in such a manner as to be separated from the respective lines 2a through 2c by a certain distance. Provision of the adhesive members 12a and 12b in this manner enables the spacer 10a to be easily folded without exposing the adhesive members 12a and 12b from the side surfaces of the radio tag 1a when the folding parts 22 are folded.

In FIG. 1, L1 indicates the length of the inlet 11 in its longitudinal direction, and D1 indicates the length of the inlet 11 in its lateral direction. In addition, L2 indicates the length of the spacer 10a in its lateral direction, and D2 indicates the length of the spacer 10a in its longitudinal direction. The length D2 is preferably twice or more as long as the length D1. In other words, as for the length of the spacer 10a in the longitudinal direction, the second spacer 101b is twice or more as long as the first spacer 101a. This tends to enable the spacer 10a to be folded up one or more times such that the inlet 11 can be held inside the folded-up spacer 10a, i.e., the inlet 11 can be held between the first spacer 101a and the second spacer 101b. Note that in the radio tag 1a according to the first embodiment, the inlet 11 is provided on the upper surface of the first spacer 101a such that the longitudinal direction of the spacer 10a and the lateral direction of the inlet 11 are made parallel to each other. Here, the inlet 11 may also be provided on the first spacer 101a such that the longitudinal direction of the spacer 10a and the longitudinal direction of the inlet 11 are made parallel to each other. In this case, the length D2 is preferably twice or more as great as the length L1. That is, the length of the spacer 10a in the longitudinal direction is preferably twice or more as long as the inlet 11 in the same direction.

Figure 3:
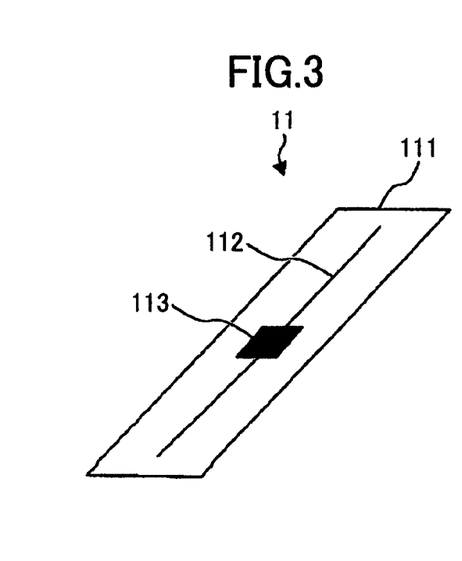
FIG. 3 is a perspective view illustrating an inlet.

Next, the configuration of the inlet 11 is described with reference to FIG. 3. FIG. 3 is a perspective view illustrating the configuration of the inlet 11. The inlet 11 has a base sheet 111, an antenna pattern 112 patterned on the base sheet 111, and a circuit chip 113 provided on the base sheet 111 and electrically connected to the antenna pattern 112. The base sheet 111 is a rectangular sheet made of a foldable material having flexibility, and is preferably a dielectric body. For example, a rubber sheet or a PET film can be used as the base sheet 111. The antenna pattern 112 is a wiring pattern for performing radio communications. The circuit chip 113 has a storage unit, and performs reading, writing, or the like of data with respect to the storage unit in response to signals received by the antenna pattern 112. The circuit chip 113 is composed of, for example, an IC chip.

The spacer 10a is folded up in such a manner as to superpose the upper surface of the first spacer 101a on the upper surface of the second spacer 101b along the line 2a as an boundary and superpose the lower surface of the second spacer 101b one surface on another along the line 2b as a boundary. Further, the spacer 10a is folded up in such a manner as to superpose the upper surface of the second spacer 101b one surface on another along the line 2c as a boundary. Since the adhesive members 12a or 12b are provided on one of the surfaces of the spacer 10a superposed one surface on another when the spacer 10a is folded up, the upper surfaces or the lower surfaces of the spacer 10a are bonded together via the adhesive members 12a or 12b. When the spacer 10a is folded up in this manner, the radio tag 1a is formed into a shape as illustrated in FIG. 4.

Figure 4:
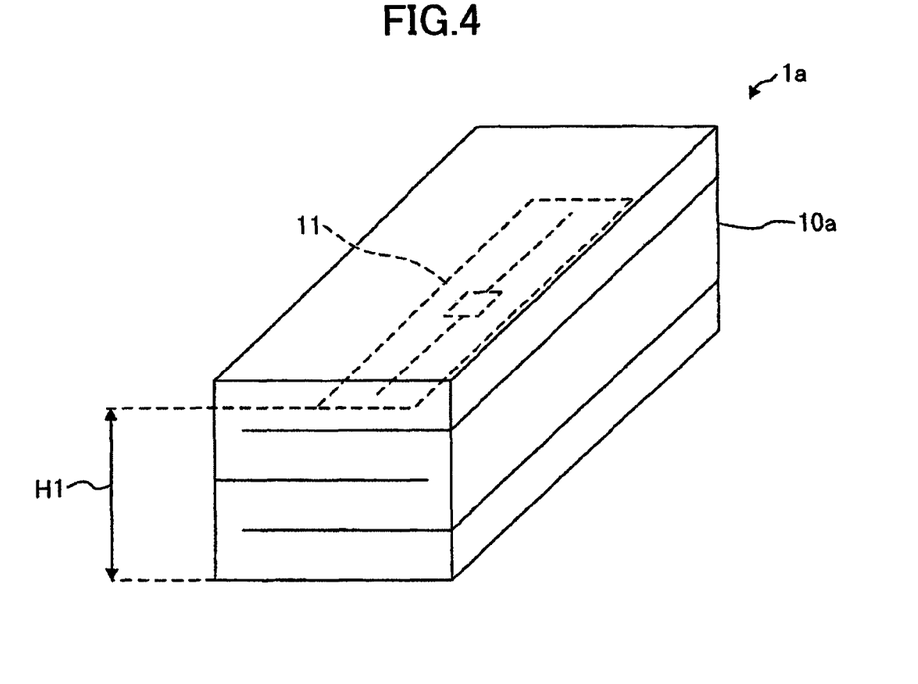
FIG. 4 is a perspective view illustrating the radio tag according to the first embodiment in a state in which a spacer is folded up.

FIG. 4 is a perspective view illustrating the radio tag 1a according to the first embodiment in a state in which the spacer 10a is folded up. The radio tag 1a illustrated in FIG. 4 causes its lower surface to act as an attachment surface which is to be attached to an attached subject. H1 indicates a height from the attachment surface to the inlet 11 in a superposed direction where the spacer 10a is superposed one surface on another.

As illustrated in FIG. 4, the radio tag 1a can ensure the height H1 when the spacer 10a is folded up in a superposed state. Accordingly, with the adjustment of the length D2 of the spacer 10a in the longitudinal direction and an increase or decrease in the number of folding-up times of the spacer 10a, the height H1 can be set to a desired value. Note that in consideration of a constituent material of an attached subject, the height H1 is preferably one that sets the radio communication distance of the circuit chip 113 to be a desired distance, i.e., a distance by which to increase the radio communication distance in the inlet 11. Further, the radio tag 1a creates a state in which the inlet 11 is held inside the spacer 10a. This is because the folding parts 22 of the spacer 10a are folded up in such a manner as to place the inlet 11 inside the spacer 10a along the lines 2a through 2c. As described above, the state in which the inlet 11 is held inside the spacer 10a enables the radio tag 1a to protect the inlet 11 against an impact or the like from an outside.

The number and the sizes of the lines 2a through 2c and the adhesive members 12a and 12b as well as the positions and intervals (hereinafter referred to as design matters) at which they are provided can be easily changed. With a change in the design matters, the radio tag can be attached to any attached subjects having various shapes. Here, a case in which a radio tag is attached to an attached subject having a stepped shape is described with reference to FIG. 5.

Figure 5:
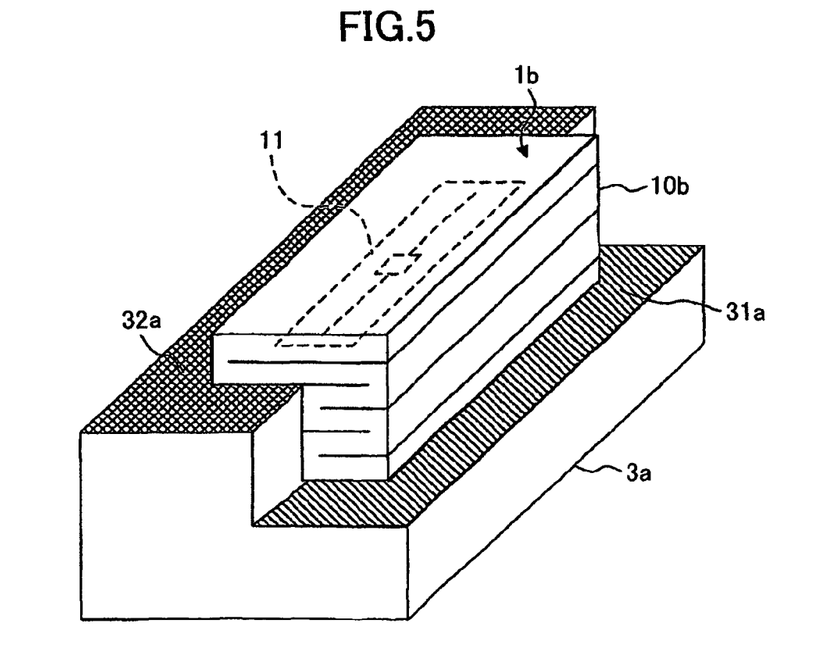
FIG. 5 is a perspective view illustrating a state in which the radio tag according to the first embodiment is attached to an attached subject having a stepped shape.

FIG. 5 is a perspective view illustrating a state in which a radio tag 1b according to the first embodiment is attached to an attached subject 3a having a stepped shape. The radio tag 1b is different from the radio tag 1a in the number and the provided positions of the lines 2a through 2c, the folding parts 22, and the adhesive members 12a and 12b illustrated in FIG. 1. In the attached subject 3a in FIG. 5, reference numeral 31a indicated by oblique lines denotes a surface forming the lower stage of the stepped shape, and reference numeral 32a indicated by hatching denotes a surface forming the upper stage of the stepped shape.

As illustrated in FIG. 5, the folding parts 22 of a spacer 10b are folded on the surface 31a in such a manner as to fill a vertical interval between the surfaces 31a and 32a in a superposed direction in which the surfaces 31a and 32a are superposed, whereby the second spacer 101b of the spacer 10b is finely folded up. After the surface of the spacer 101b finely folded up on the surface 31a is at the same level as the surface 32a, the second spacer 101b and the first spacer 101a are largely folded up on the surface 32a. As described above, irregularly folding up the spacer 10b so as to conform with the stepped shape of the subject 3a makes it possible to easily attach the radio tag 1b to the attached subject 3a in conformity with the stepped shape.

Figure 6:
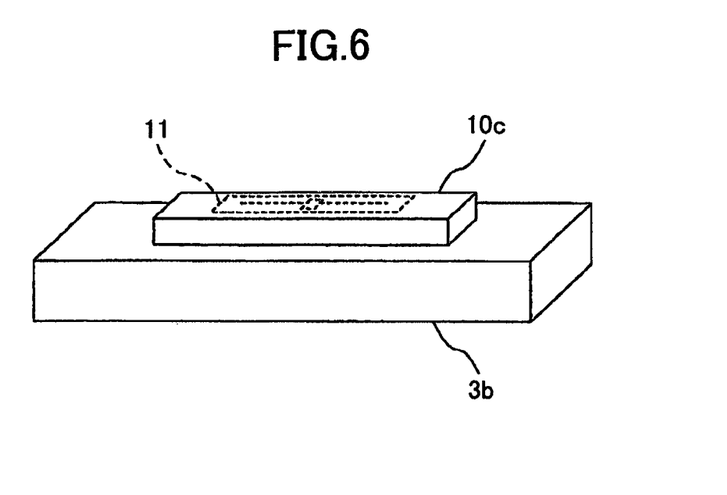
FIG. 6 is a perspective view illustrating a state in which a radio tag different from the radio tag according to the first embodiment is attached to an attached subject having a plate shape.
Figure 7:
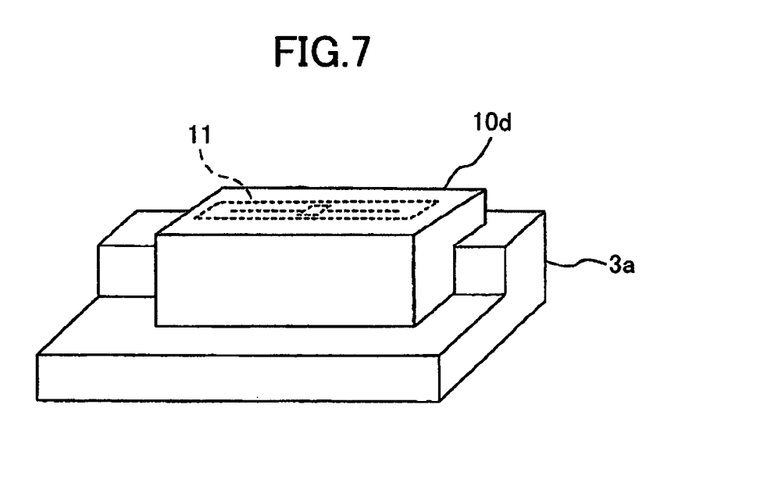
FIG. 7 is a perspective view illustrating a state in which a radio tag different from the radio tag according to the first embodiment is attached to the attached subject having the stepped shape.

Here, as comparative examples of the radio tags 1a and 1b according to the first embodiment, radio tags each having a spacer different from the spacers 10a and 10b are described with reference to FIGS. 6 and 7. FIG. 6 is a perspective view illustrating a state in which the radio tag different from the radio tag according to the first embodiment is attached to an attached subject 3b having a plate shape. FIG. 7 is a perspective view illustrating a state in which the radio tag different from the radio tag according to the first embodiment is attached to the attached subject 3a having the stepped shape. Reference numeral 10c illustrated in FIG. 6 denotes a spacer uniquely manufactured so as to conform with the shape of the attached subject 3b, and reference numeral 10d illustrated in FIG. 7 denotes a spacer uniquely manufactured so as to conform with the shape of the attached subject 3a.

As illustrated in FIGS. 6 and 7, the spacers 10c and 10d are manufactured so as to conform with the shapes of the attached subjects 3b and 3a, respectively. For this reason, it is difficult for the spacers 10c and 10d to be attached to other attached subjects. Accordingly, if the attached subjects are changed, the spacers 10c and 10d are required to be redesigned and remanufactured. However, since the spacers 10a and 10b can be folded up so as to conform with the shapes of the attached subjects, the radio tags 1a and 1b according to the first embodiment can be easily attached regardless of the shapes of the attached subjects 3a and 3b.

According to the first embodiment, it is only required to change the way of folding up the spacers in order to attach the radio tags 1a and 1b to the subjects having plural shapes such as the plate shape and the stepped shape. In addition, it is only required to change the lengths of the spacers 10a and 10b of the radio tags 1a and 1b in order to change the total thicknesses and the heights H1 of the folded spacers 10a and 10b in their superposed direction. Therefore, the total thickness and the height H1 of the radio tags 1a and 1b can be easily adjusted.

Second Embodiment

The first embodiment describes a case in which the radio tags are attached to the attached subject having the stepped shape. On the other hand, a second embodiment describes a case in which a radio tag is attached to an attached subject having a cylindrical shape.

Figure 8:
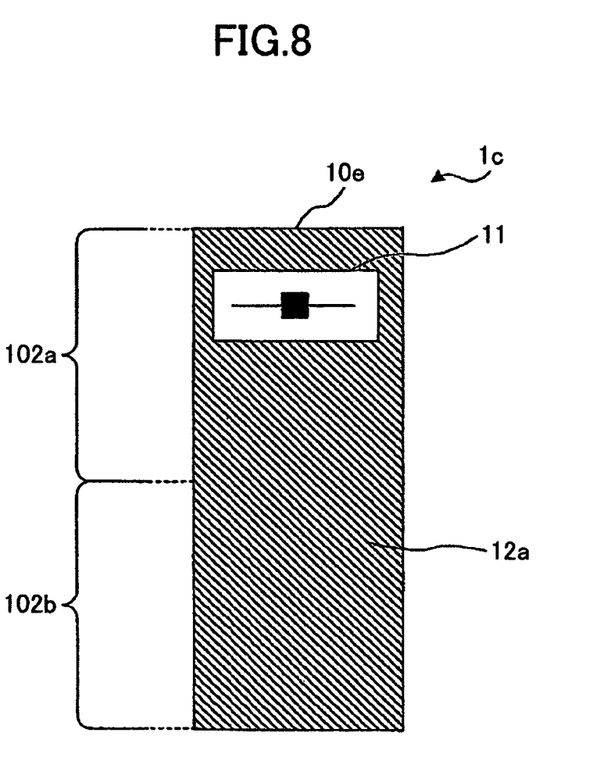
FIG. 8 is a top view illustrating a radio tag according to a second embodiment.
Figure 9:
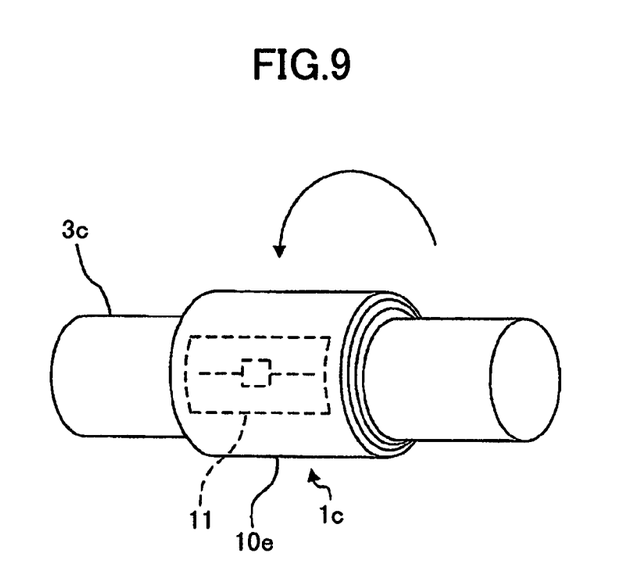
FIG. 9 is a perspective view illustrating a state in which the radio tag according to the second embodiment is attached to an attached subject having a cylindrical shape.

FIG. 8 is a top view illustrating a radio tag 1c according to the second embodiment. FIG. 9 is a perspective view illustrating a state in which the radio tag 1c according to the second embodiment is attached to an attached subject 3c having a cylindrical shape. In FIGS. 8 and 9, the same parts as those of FIG. 1 are denoted by the same reference numerals and their duplicated descriptions are omitted. The radio tag 1c is different from the radio tag 1a in that it does not have the lines 2a through 2c and the adhesive members 12b illustrated in FIG. 1 and has an adhesive member 12a on the entire upper surface of a spacer 10e. The radio tag 1c is different from the radio tag 1a in that the spacer 10e is composed of a first spacer 102a in which an inlet 11 is provided and a second spacer 102b connected to the first spacer 102a in parallel with the surface of the first spacer 102a in which the inlet 11 is provided.

The radio tag 1c is different from the radio tag 1a in that the first spacer 102a is superposed on the lower surface of the second spacer 102b and thus acts as a protecting member that holds the inlet 11 between the first spacer 102a and the second spacer 102b so as to be protected from an outside. In addition, the radio tag 1c is different from the radio tag 1a in that the second spacer 102b is wound on an attached subject 3c in a superposed state and thus acts as a spacer for separating the inlet 11 from the attached subject 3c by a certain distance or more.

As illustrated in FIG. 9, winding the spacer 10e on the attached subject 3c in a superposed state makes it possible to easily attach the radio tag 1c so as to conform with the radius of the attached subject 3c. In addition, winding the first spacer 102a on the attached subject 3c so as to place the inlet 11 inside the radio tag 1c makes it possible for the radio tag 1c to protect the inlet 11 against an impact or the like from an outside. Moreover, adjusting only the length of the spacer 10e makes it possible to adjust the number of winding times of the spacer 10e on the attached subject 3c and set the height of the inlet 11 from the peripheral wall of the attached subject 3c to be a desired height.

Figure 10:
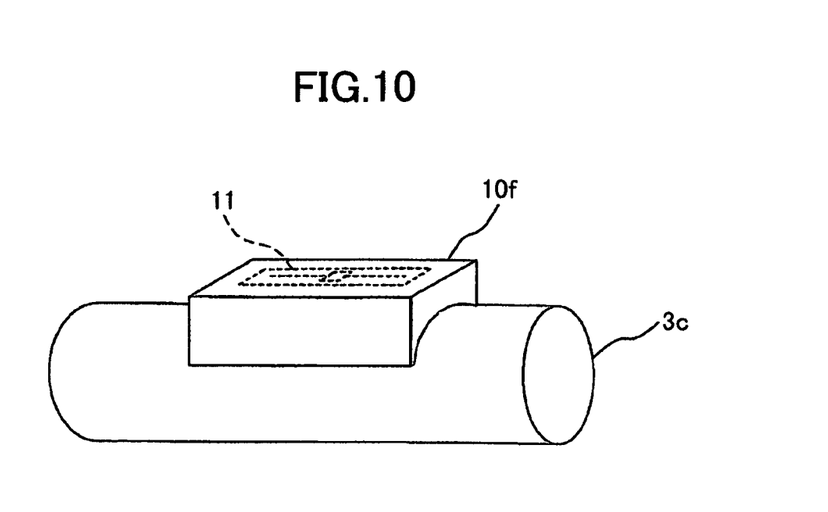
FIG. 10 is a perspective view illustrating a state in which a radio tag different from the radio tag according to the second embodiment is attached to the attached subject having the cylindrical shape.

Here, as a comparative example of the radio tag 1c according to the second embodiment, a radio tag having a spacer different from the spacer 10e is described with reference to FIG. 10. FIG. 10 is a perspective view illustrating a state in which the radio tag different from the radio tag 1c according to the second embodiment is attached to the attached subject 3c having the cylindrical shape. Reference numeral 10f illustrated in FIG. 10 denotes the spacer uniquely manufactured so as to conform with the shape of the attached subject 3c (the radius of the subject 3c).

As illustrated in FIG. 10, the spacer 10f is manufactured so as to conform with the radius of the attached subject 3c having the cylindrical shape. For this reason, if the radius of the attached subject 3c is changed, it is difficult for the spacer 10f to be attached to the attached subject 3c. Accordingly, if the attached subject 3c is changed, the spacer 10f is required to be redesigned and remanufactured.

On the other hand, the radio tag 1c according to the second embodiment is wound such that the spacer 10e conforms with the radius of the attached subject 3c. Therefore, even if the radius of the attached subject 3c is different, the radio tag 1c can be easily attached to the attached subject 3c. In addition, in order to change the total thickness or the height of the spacer 10e in a superposed direction, it is only required to adjust the length of the spacer 10e of the radio tag 1c. For this reason, the total thickness and the height of the radio tag 1c up to the inlet 11 or an antenna pattern 112 can be easily adjusted.

Third Embodiment

The first and second embodiments describe the radio tags, each of which has the rectangular spacer. On the other hand, a third embodiment describes a radio tag having an elliptical spacer.

Figure 11:
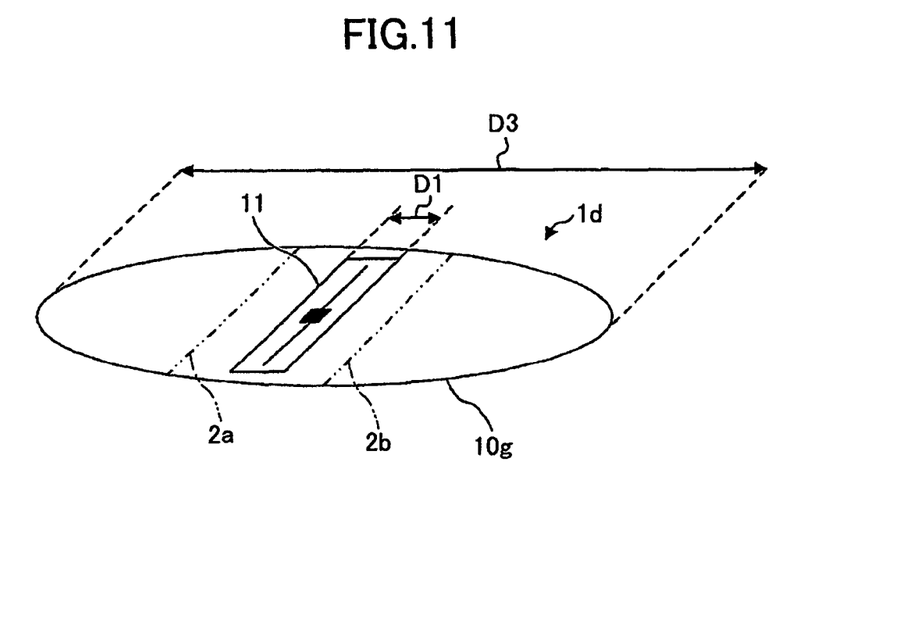
FIG. 11 is a perspective view illustrating a radio tag according to a third embodiment.
Figure 12:
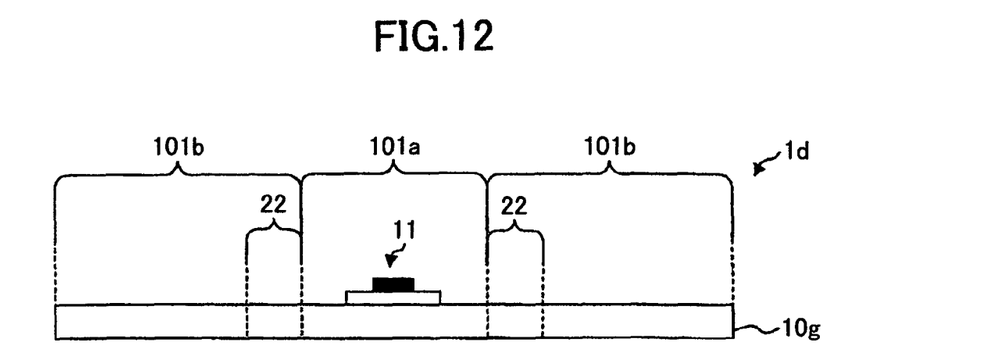
FIG. 12 is a side view illustrating the radio tag according to the third embodiment.

FIG. 11 is a perspective view illustrating a radio tag 1d according to the third embodiment. FIG. 12 is a side view illustrating the radio tag 1d according to the third embodiment. In FIGS. 11 and 12, the same parts as those of FIGS. 1 and 2 are denoted by the same reference numerals and their duplicated descriptions are omitted. The radio tag 1d is different from the radio tag 1a in that it has an inlet 11 on the upper surface of an elliptical spacer 10g. Further, D3 illustrated in FIG. 11 indicates the length of the spacer 10g in its long axis direction.

As illustrated in FIGS. 11 and 12, the shape of the spacer 10g of the radio tag 1d may be an ellipse rather than being a rectangle, provided that the spacer 10g can be folded along lines 2a and 2b with the inlet 11 held inside the folded-up spacer 10g. Here, similar to the case of the rectangular spacer 10a, the length D3 is preferably twice or more as long as D1 indicating the length of the inlet 11 in its lateral direction.

Fourth Embodiment

The third embodiment describes the radio tag having the elliptical spacer. On the other hand, a fourth embodiment describes a radio tag having a cross spacer.

Figure 13:
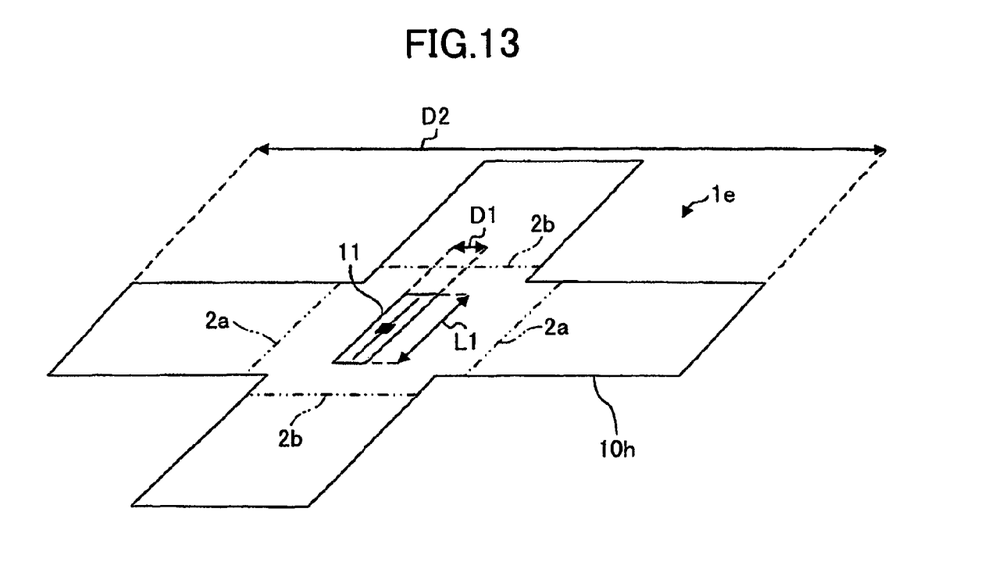
FIG. 13 is a perspective view illustrating a radio tag according to a fourth embodiment.
Figure 14:
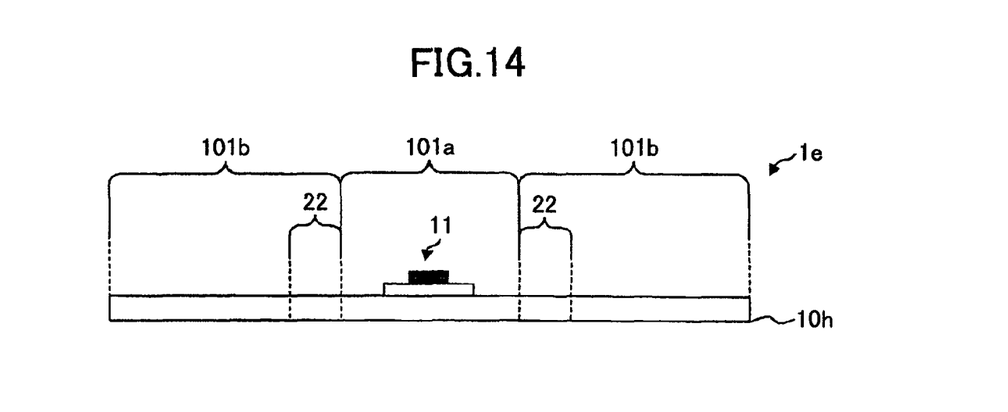
FIG. 14 is a side view illustrating the radio tag according to the fourth embodiment.

FIG. 13 is a perspective view illustrating a radio tag 1e according to the fourth embodiment. FIG. 14 is a side view illustrating the radio tag 1e according to the fourth embodiment. In FIGS. 13 and 14, the same parts as those of FIGS. 1 and 2 are denoted by the same reference numerals and their duplicated descriptions are omitted. The radio tag 1e is different from the radio tag 1a in that it has an inlet 11 on the upper surface of a cross spacer 10h.

As illustrated in FIGS. 13 and 14, the shape of the spacer 10h of the radio tag 1e may be a cross rather than being a rectangle, provided that the spacer 10h can be folded along lines 2a and 2b with the inlet 11 held inside the folded-up spacer 10h. Here, as in the case of the rectangular spacer 10a, D2 indicating the length of the spacer 10h in its longitudinal direction is preferably twice or more as long as D1 indicating the length of the inlet 11 in its lateral direction.

Note that in the fourth embodiment, the lines 2a are provided so as to be orthogonal to a direction indicated by the length D2. However, one of or both of the lines 2b provided so as to be parallel to the direction indicated by the length D2 may be the lines 2a. In this case, the length of the spacer 10h in the direction orthogonal to the direction indicated by the length D2 is preferably twice or more as long as L1 indicating the length of the inlet 11 in its longitudinal direction. As described in the foregoing, the third embodiment describes the radio tag having the elliptical spacer, and the fourth embodiment describes the radio tag having the cross spacer. However, the spacers are not limited to these and other spacers such as a circular spacer and a square spacer may be used.

Fifth Embodiment

A fifth embodiment describes a radio tag in which rectangular plate-shaped members (hereinafter referred to as spacer blocks) that ensure the height H1 illustrated in FIG. 1 when the spacer 10a is folded up are provided on the upper surface of the spacer 10a.

Figure 15:
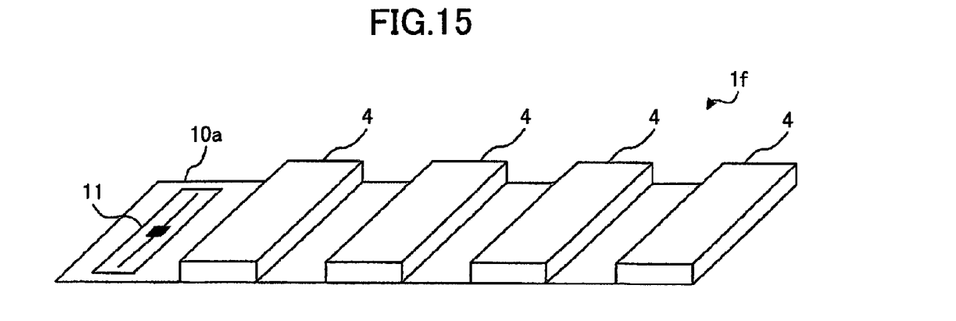
FIG. 15 is a perspective view illustrating a radio tag according to a fifth embodiment.
Figure 16:
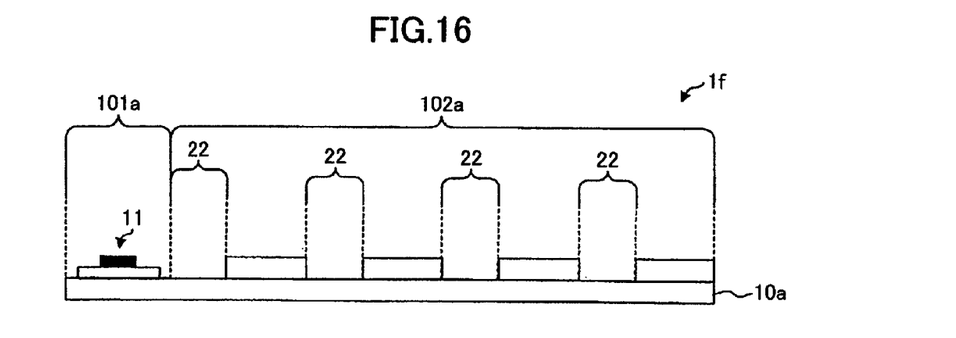
FIG. 16 is a side view illustrating the radio tag according to the fifth embodiment.
Figure 17:
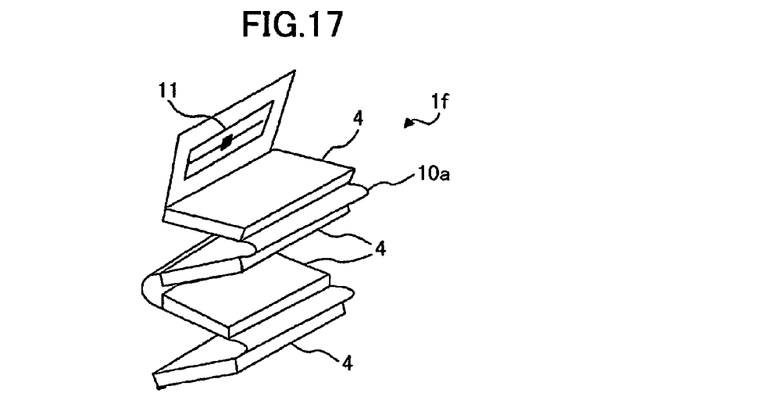
FIG. 17 is a perspective view illustrating a method for folding up a spacer.
Figure 18:
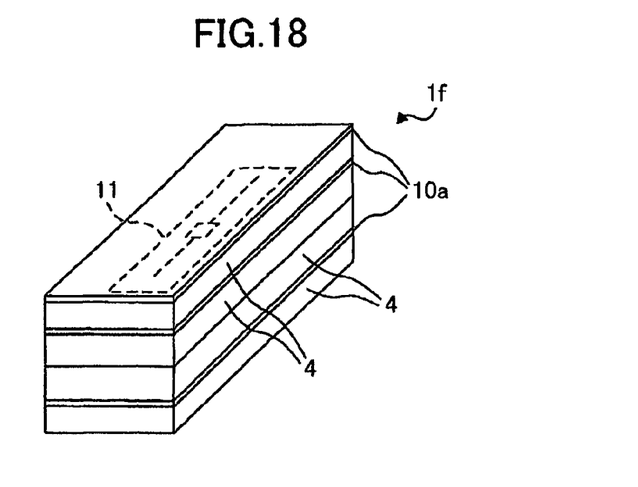
FIG. 18 is a perspective view illustrating the radio tag according to the fifth embodiment in a state in which the spacer is folded up.

FIG. 15 is a perspective view illustrating a radio tag 1f according to the fifth embodiment. FIG. 16 is a side view illustrating the radio tag 1f according to the fifth embodiment. FIG. 17 is a perspective view illustrating a method for folding up the spacer 10a. FIG. 18 is a perspective view illustrating the radio tag 1f according to the fifth embodiment in a state in which the spacer 10a is folded up. In FIGS. 15 through 18, the same parts as those of FIGS. 1 and 2 are denoted by the same reference numerals and their duplicated descriptions are omitted. Reference numeral 4 denotes the spacer block having an adhesive member on its upper surface. The spacer block 4 is preferably a dielectric body having a greater thickness than that of the spacer 10a. For example, in a case where the spacer 10a has a thickness of 0.1 mm, a plastic plate or a rubber sheet having a thickness of 0.25 mm is used as the spacer block 4.

As illustrated in FIGS. 15 and 16, the radio tag 1f is different from the radio tag 1a in that it has the four rectangular spacer blocks 4 at even intervals on the upper surface of the spacer 10a. Note that the number, the shapes, and the intervals of the spacer blocks 4 are not limited to them, but may be appropriately selected in accordance with the shape of an attached subject, the shape of the radio tag 1f, or the like. Further, the spacer blocks 4 are only required to be provided on at least one of the surfaces of the spacer 10a superposed one surface on another when the spacer 10a is folded up.

As illustrated in FIG. 17, the spacer 10a is folded up such that the spacer blocks 4 are held between the surfaces of the spacer 10a superposed one surface on another when the spacer 10a is folded up. When the spacer 10a is folded up, the radio tag 1f creates a state in which the spacer blocks 4 are provided inside the folded-up spacer 10a as illustrated in FIG. 18. With the provision of the spacer blocks 4 inside the folded-up spacer 10a, the radio tag 1f can add the thicknesses of the spacer blocks 4 in a superposed direction and ensure a desired height up to the inlet 11 or an antenna pattern 112 with a small number of folding-up times of the spacer 10a.

On the other hand, the spacer 10a according to the first embodiment is folded up in a superposed state with respect to the attached subject until the spacer 10a ensures the desired height H1. For example, let it be assumed that the total thickness of the spacer 10a in the superposed direction is 10 mm so as to ensure the desired height H1 at the time of folding up the spacer 10a. In this case, the spacer 10a is folded up for 100 times if the thickness of the spacer 10a is 0.1 mm. However, in the radio tag 1f according to the fifth embodiment, the provision of the spacer blocks 4 on at least one of the surfaces of the spacer 10a superposed one surface on another when the spacer 10a is folded up enables the number of folding-up times of the spacer 10a to be reduced. In addition, the adjustment of the thicknesses of the spacer blocks 4 can facilitate the adjustment of the total thickness of the spacer 10a and the height of the spacer 10a up to the inlet 11 or the antenna pattern 112.

Sixth Embodiment

The first through fifth embodiments describe the single radio tags. On the other hand, a sixth embodiment describes a radio tag sheet in which plural radio tags 1c are continuously connected.

Figure 19:
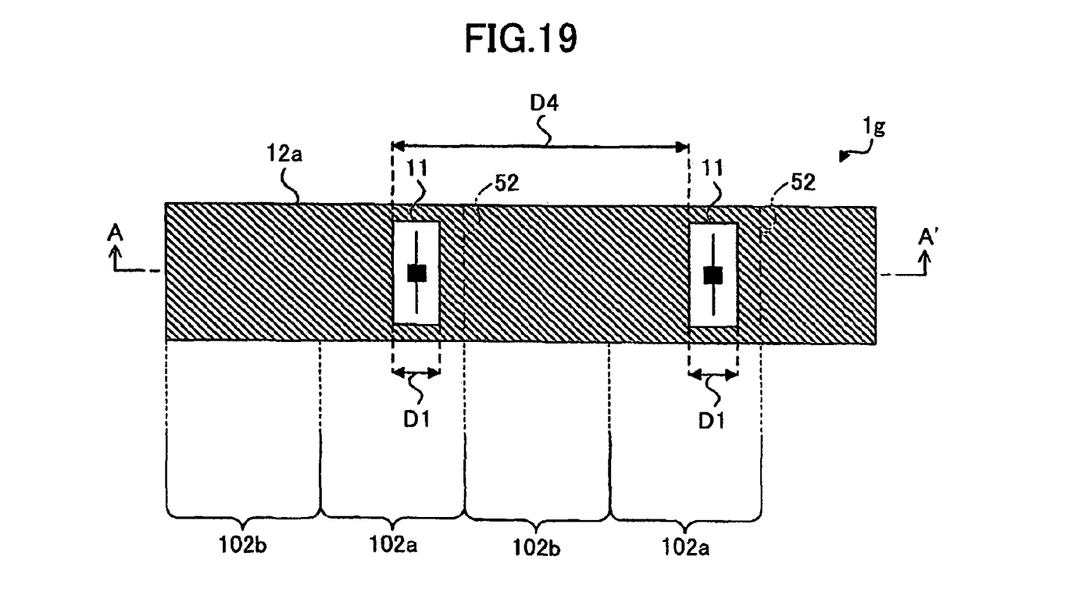
FIG. 19 is a top view illustrating a radio tag sheet according to a sixth embodiment.
Figure 20:
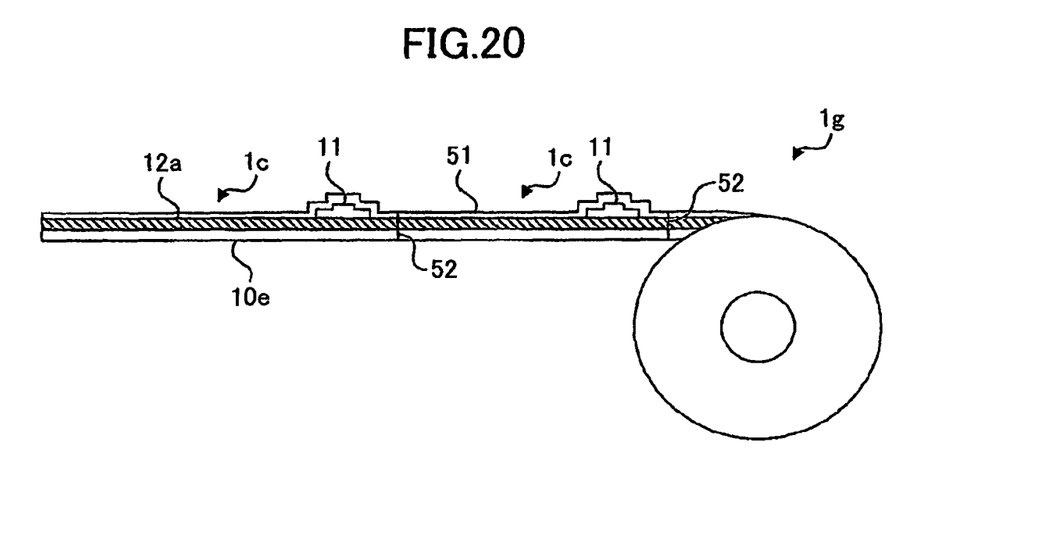
FIG. 20 is a cross-sectional view taken along line A-A' of the radio tag sheet according to the sixth embodiment.
Figure 21:
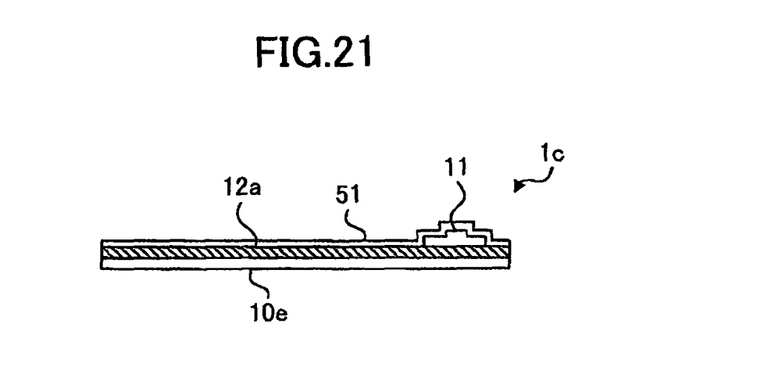
FIG. 21 is a cross-sectional view illustrating one of the radio tags detached from the radio tag sheet according to the sixth embodiment.

FIG. 19 is a top view illustrating a radio tag sheet 1g according to the sixth embodiment. FIG. 20 is a cross-sectional view taken along line A-A' of the radio tag sheet 1g according to the sixth embodiment. FIG. 21 is a cross-sectional view illustrating one of the radio tags 1c detached from the radio tag sheet 1g according to the sixth embodiment. In FIGS. 19 through 21, the same parts as those of FIG. 8 are denoted by the same reference numerals and their duplicated descriptions are omitted.

As illustrated in FIGS. 19 and 20, the radio tag sheet 1g is formed such that a spacer 10e having an adhesive member 12a on its entire upper surface is wound like a roll. Plural inlets 11 are bonded onto the adhesive member 12a at intervals of D4. The inlets 11 are similarly provided in the roll part of the spacer 10e. A separation sheet 51 is stuck onto the adhesive member 12a and the inlets 11. Sticking of the separation sheet 51 prevents the adhesive member 12a from being bonded onto the lower surface of the spacer 10e even if the spacer 10e is a roll type.

Further, the spacer 10e has detaching lines 52 at the same intervals as D4 at which the inlets 11 are provided. Note that the detaching lines 52 are preferably provided so as to penetrate the separation sheet 51 and the adhesive member 12a. The detaching lines 52 may only be those facilitating detachment from the spacer 10e, which are exemplified by cut lines or perforated lines formed in the spacer 10e. The interval D4 at which the inlets 11 and the detaching lines 52 are provided is preferably twice or more as long as D1 indicating the length of the inlet 11 in its lateral direction. Here, in a case where the inlets 11 are provided on the spacer 10e such that the longitudinal direction of the spacer 10e is parallel to the longitudinal direction of the inlets 11, the interval D4 is preferably twice or more as long as the length of the inlet 11 in the longitudinal direction.

When the spacer 10e of the radio tag sheet 1g is cut along the detaching line 52, the radio tag 1c having the one inlet 11 as illustrated in FIG. 21 is obtained. Accordingly, when the radio tag sheet 1g is appropriately cut along the detaching line 52, the radio tag 1c is obtained. Thus, even in a case where the plural radio tags 1c are used, it is not required to prepare a multiplicity of the radio tags 1c but is only required to prepare the one radio tag sheet 1g, which in turn facilitates the management of the radio tags 1c.

Note that in the radio tag sheet 1g according to the sixth embodiment, the adhesive member 12a is provided on the entire upper surface of the spacer 10e, and the plural radio tags 1c are continuously connected. However, the radio tag sheet 1g may be formed such that the lines 2a through 2c, the adhesive members 12a and 12b having different sizes, and the like are provided with respect to the spacer 10a, 10b, 10e, 10g, or 10h and the plural radio tags 1a through if are continuously connected.

Figure 22:
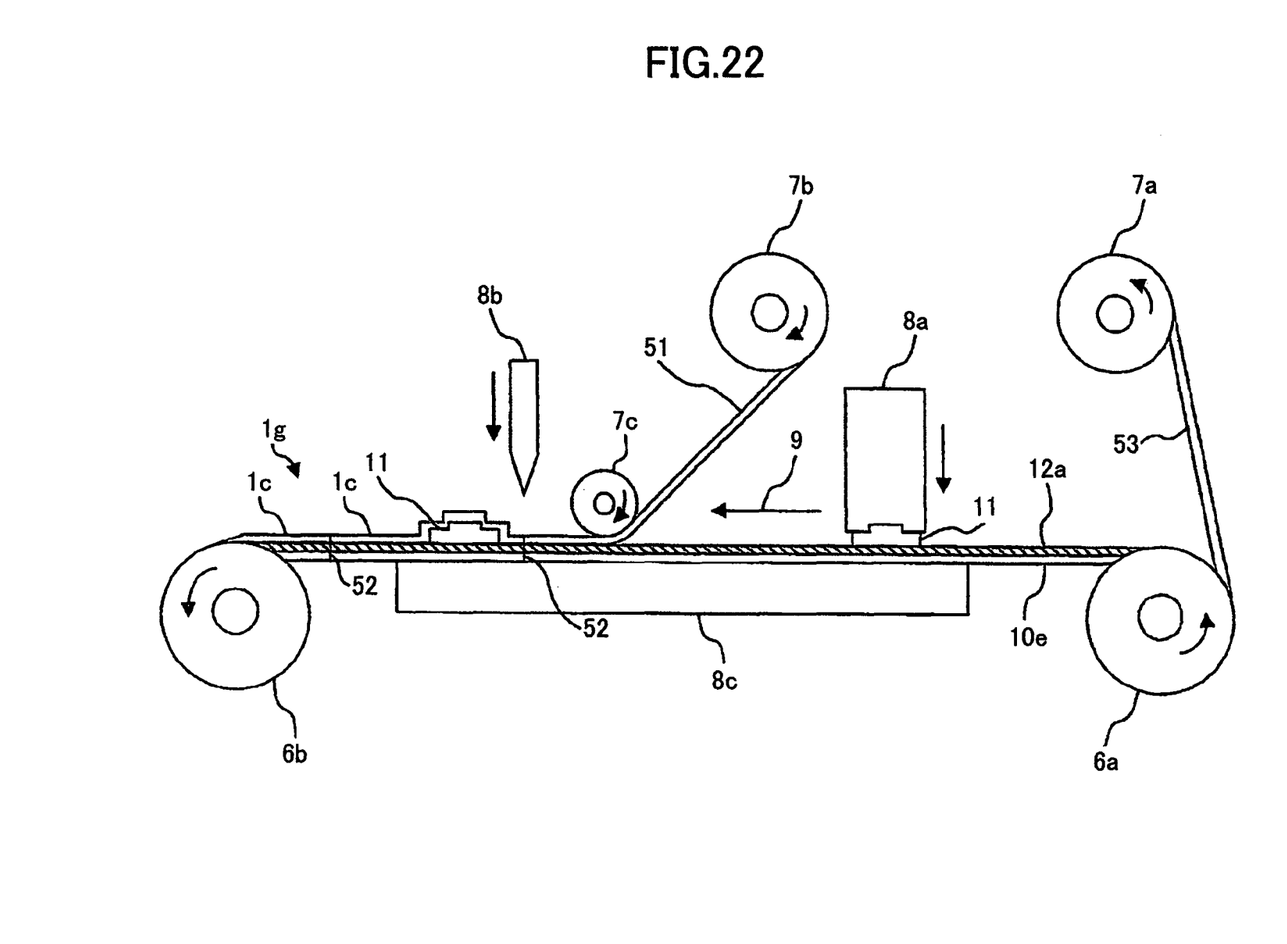
FIG. 22 is a schematic view for illustrating the process of manufacturing the radio tag sheet according to the sixth embodiment.

Here, a method for manufacturing the radio tag sheet 1g according to the sixth embodiment is described with reference to FIG. 22. FIG. 22 is a schematic view for illustrating the process of manufacturing the radio tag sheet 1g according to the sixth embodiment. Reference numeral 6a illustrated in FIG. 22 denotes a roll on which the spacer 10e is wound. The spacer 10e has the adhesive member 12a on its entire upper surface and a separation sheet 53 stuck onto the adhesive member 12a. Reference numeral 6b denotes a roll that rewinds the spacer 10e on a downstream side in a conveyance direction 9. Reference numeral 7a denotes a roll that rewinds the separation sheet 53 from the roll 6a, and reference numeral 7b denotes a roll on which is wound the separation sheet 51 to be stuck onto the spacer 10e from which the separation sheet 53 is rewound. Reference numeral 7c denotes a roller that withdraws the separation sheet 51 wound on the roll 7b and causes the same to be stuck onto the upper surface of the spacer 10e.

Reference numeral 8a denotes a mounting tool that mounts the inlets 11 on the upper surface of the spacer 10e, and reference numeral 8b denotes a detaching tool that provides the detaching lines 52 with respect to the spacer 10e. For example, the detaching tool 8b provides the detaching lines 52 in such a manner that a circular sawtooth is turned on the spacer 10e. Reference numeral 8c denotes a stage. On the stage 8c, mounting of the inlets 11 on the upper surface of the spacer 10e or the like is performed.

First, when the roll 6b is rotated, the spacer 10e is withdrawn from the roll 6a and conveyed. As the spacer 10e is withdrawn from the roll 6a, the separation sheet 53 having been stuck onto the upper surface of the adhesive member 12a is separated by the roll 7a. The inlets 11 are provided on the upper surface of the spacer 10e, from which the separation sheet 53 is separated, at intervals of D4 illustrated in FIG. 19 by the mounting tool 8a, and then bonded onto the upper surface of the spacer 10e by the adhesive member 12a. Then, the separation sheet 51 withdrawn from the roll 7b is stuck onto the inlets 11 and the adhesive member 12a of the spacer 10e by the roller 7c. After that, with respect to the spacer 10e onto which the separation sheet 51 is stuck, the detaching lines 52 are provided between the inlets 11 at intervals of D4 by the detaching tool 8b. Note that the detaching lines 52 are preferably provided near the inlets 11. The spacer 10e having the detaching lines 52 is formed into the radio tag sheet 1g and wound by the roll 6b.

Note that the description here is made of the method for manufacturing the radio tag sheet 1g in which the plural radio tags 1c are continuously connected. Here, in the case of manufacturing a radio tag sheet in which the plural radio tags 1a through 1f are continuously connected, it is possible to use a roll on which is wound the spacer 10a, 10b, 10e, 10g, or 10h having the lines 2a through 2c, the adhesive members 12a and 12b of different sizes, and the like rather than using the roll 6a. In this case, the lines 2a through 2c may be provided after the separation sheet 51 is stuck onto the spacer 10a, 10b, 10e, 10g, or 10h.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:

1. A radio tag comprising:
   an inlet having a base member, an antenna pattern, and a circuit chip for performing radio communications, the antenna pattern and the circuit chip being provided in the base member; and
   a spacer on which the inlet is provided;
   wherein the spacer has a length in a longitudinal direction thereof twice or more as great as a length of the inlet in the longitudinal direction,
   wherein the spacer has a flection part at which the spacer is foldable in such a manner as to form an attached surface to be attached to an attached subject of the radio tag, and
   wherein the spacer is configured to ensure a predetermined height of the radio tag by folding up in a superposed state.

2. The radio tag according to claim 1,
   wherein the spacer is foldable in such a manner as to place the inlet thereinside.

3. The radio tag according to claim 1,
   wherein the spacer comprises
   a first spacer in which the inlet is provided and
   a second spacer connected to the first spacer via the flection part and having a length longer than the first spacer in a longitudinal direction thereof.

4. The radio tag according to claim 1,
   wherein an adhesive member is provided on at least one of surfaces of the spacer superposed one on another when the spacer is folded up.

5. The radio tag according to claim 1,
   wherein, in order to ensure the predetermined height in a superposed direction of the spacer, a plate-shaped member is provided on at least one of surfaces of the spacer superposed one on another when the spacer is folded up.

6. The radio tag according to claim 1,
   wherein the radio tag includes a plurality of radio tags that are continuously connected, and
   each of the plural radio tags is detachable at a detaching line provided at an end part of the spacer.

7. The radio tag according to claim 1,
   wherein the flection part has a folding line indicating a folding part and is folded along the folding line.

8. A radio tag comprising:
   an inlet having a base member, an antenna pattern, and a circuit chip for performing radio communications, the antenna pattern and the circuit chip being provided in the base member; and
   a spacer on which the inlet is provided;
   wherein the spacer has a length in a longitudinal direction thereof twice or more as great as a length of the inlet in the longitudinal direction, and
   wherein the spacer has flexibility 95 as to be windable on an attached subject of the radio tag in a superposed state.

9. The radio tag according to claim 8,
   wherein the spacer is windable on the attached subject in the superposed state in such a manner as to place the inlet thereinside.

10. The radio tag according to claim 8,
    wherein the spacer comprises
    a first spacer in which the inlet is provided and
    a second spacer connected to the first spacer and having a length larger than the first spacer in a longitudinal direction thereof.

11. The radio tag according to claim 8,
    wherein an adhesive member is provided on at least one of an upper surface and a lower surface of the spacer.

12. The radio tag according to claim 8,
    wherein the radio tag includes a plurality of radio tags that are continuously connected, and
    each of the plural radio tags is detachable at a detaching line provided at an end part of the spacer.

13. A method for manufacturing a radio tag, comprising:
    conveying a spacer having an adhesive member on an upper surface thereof;
    bonding onto the upper surface of the spacer plural inlets, each of which has a circuit chip for performing radio communications and an antenna pattern provided on a base member, at intervals twice or more as long as lengths of the inlets in a conveyance direction of conveying the spacer;
    sticking a first separation sheet on the inlets and the spacer; and
    providing detaching lines at the intervals in the spacer and the first separation sheet between the inlets.

14. The method for manufacturing the radio tag according to claim 13, wherein the adhesive member on the upper surface of the spacer has a second separation sheet on a front surface thereof, and
    the inlets are bonded onto the spacer at the intervals while the second separation sheet is separated.

* * * * *

UNITED STATES PATENT AND TRADEMARK OFFICE
CERTIFICATE OF CORRECTION

PATENT NO. : 8,453,938 B2
APPLICATION NO. : 13/067702
DATED : June 4, 2013
INVENTOR(S) : Shunji Baba et al.

Page 1 of 1

It is certified that error appears in the above-identified patent and that said Letters Patent is hereby corrected as shown below:

In the Claims

Column 12, Line 27, In Claim 8, delete "95" and insert -- so --, therefor.

Signed and Sealed this
Seventeenth Day of September, 2013

Teresa Stanek Rea
*Deputy Director of the United States Patent and Trademark Office*